United States Patent
Martin et al.

(10) Patent No.: US 10,516,901 B2
(45) Date of Patent: Dec. 24, 2019

(54) METHOD AND APPARATUS FOR ADVANCED AUDIO/VIDEO STREAM MANAGEMENT TO INCREASE ADVERTISING OPPORTUNITY

(71) Applicant: FORD GLOBAL TECHNOLOGIES, LLC, Dearborn, MI (US)

(72) Inventors: Daryl Martin, Kitchener (CA); John William Schmotzer, Canton, MI (US); Jae Hyung Lim, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/976,565

(22) Filed: May 10, 2018

(65) Prior Publication Data

US 2019/0349614 A1   Nov. 14, 2019

(51) Int. Cl.
| | |
|---|---|
| *H04N 21/234* | (2011.01) |
| *H04N 21/81* | (2011.01) |
| *H04N 21/2387* | (2011.01) |

(52) U.S. Cl.
CPC ... *H04N 21/23424* (2013.01); *H04N 21/2387* (2013.01); *H04N 21/23406* (2013.01); *H04N 21/812* (2013.01)

(58) Field of Classification Search
CPC .................. H04N 21/23424; H04N 21/812
See application file for complete search history.

(56) References Cited

U.S. PATENT DOCUMENTS

| | | | |
|---|---|---|---|
| 5,345,430 A | * | 9/1994 | Moe ............ G11B 27/024 360/7 |
| 6,952,559 B2 | | 10/2005 | Bates et al. |
| 8,005,540 B2 | | 11/2011 | Pudar |
| 2016/0044343 A1 | * | 2/2016 | Bost ............ G06T 1/60 725/32 |
| 2017/0032402 A1 | | 2/2017 | Patsiokas et al. |

* cited by examiner

*Primary Examiner* — Hsiungfei Peng
*Assistant Examiner* — Fred Ping
(74) *Attorney, Agent, or Firm* — Michael Spenner; Brooks Kushman P.C.

(57) ABSTRACT

A system includes a processor configured to store a buffer of accelerable broadcast content. The processor is also configured to determine that a predefined condition exists, defining a situation where content acceleration is appropriate. The processor is further configured to determine a broadcast content playback point where content should be accelerated and playback a predetermined portion of the buffer at a predefined accelerated pace, responsive to reaching the playback point.

6 Claims, 5 Drawing Sheets

US 10,516,901 B2

METHOD AND APPARATUS FOR ADVANCED AUDIO/VIDEO STREAM MANAGEMENT TO INCREASE ADVERTISING OPPORTUNITY

TECHNICAL FIELD

The illustrative embodiments generally relate to methods and apparatuses for advanced audio/video stream management to increase advertising opportunity.

BACKGROUND

There are a variety of media sources available in both analog and digital formats, and users can choose from many of these sources while traveling in a vehicle. Typically, these sources are funded through subscription payments or advertisements included in the streams. Since the value of an advertisement is dependent upon listeners/viewers actually hearing/seeing the advertisement, advertisers want to ensure that their content is being consumed.

With the considerable number of options, it is simple for a listener to change stations or sources to avoid advertisements included in a current source. Also, in vehicles, a driver may simply end a drive before the full advertisement plays, ending the advertisement prematurely.

On the other hand, if a vehicle destination and time to destination is known, assuming the user does not turn off content entirely, there are some assurances about having the user's attention for any content being played back before the user reaches a destination. Similar knowledge and planning capability exists with regards to programs of determined length and sporting events having a determined ending.

SUMMARY

In a first illustrative embodiment, a system includes a processor configured to store a buffer of accelerable broadcast content. The processor is also configured to determine that a predefined condition exists, defining a situation where content acceleration is appropriate. The processor is further configured to determine a broadcast content playback point where content should be accelerated and playback a predetermined portion of the buffer at an predefined accelerated pace, responsive to reaching the playback point.

In a second illustrative embodiment, a system includes a processor configured to reach a planned advertisement playback point in a live broadcast. The processor is further configured to begin advertisement playback, over the live broadcast, from a stored buffer of advertisements predesignated by a broadcast entity for playback in the live broadcast, responsive to reaching the point. The processor is additionally configured to accelerate advertisement playback from the buffer at a predefined acceleration rate, responsive to determining that acceleration will result in a certain number of advertisements completing playback by a target time, the target time ahead of when the same advertisements will complete playback in the live broadcast.

In a third illustrative embodiment, a computer-implemented method includes storing a buffer of advertisement content predesignated by a broadcast entity for playback during a live broadcast. The method also includes reaching an advertisement playback point in the live broadcast. The method further includes playing advertisements from the buffer at a predefined accelerated pace to create a time gap between completion of the advertisements and planned resumption of the live broadcast and playing an additional advertisement in the time gap once created.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
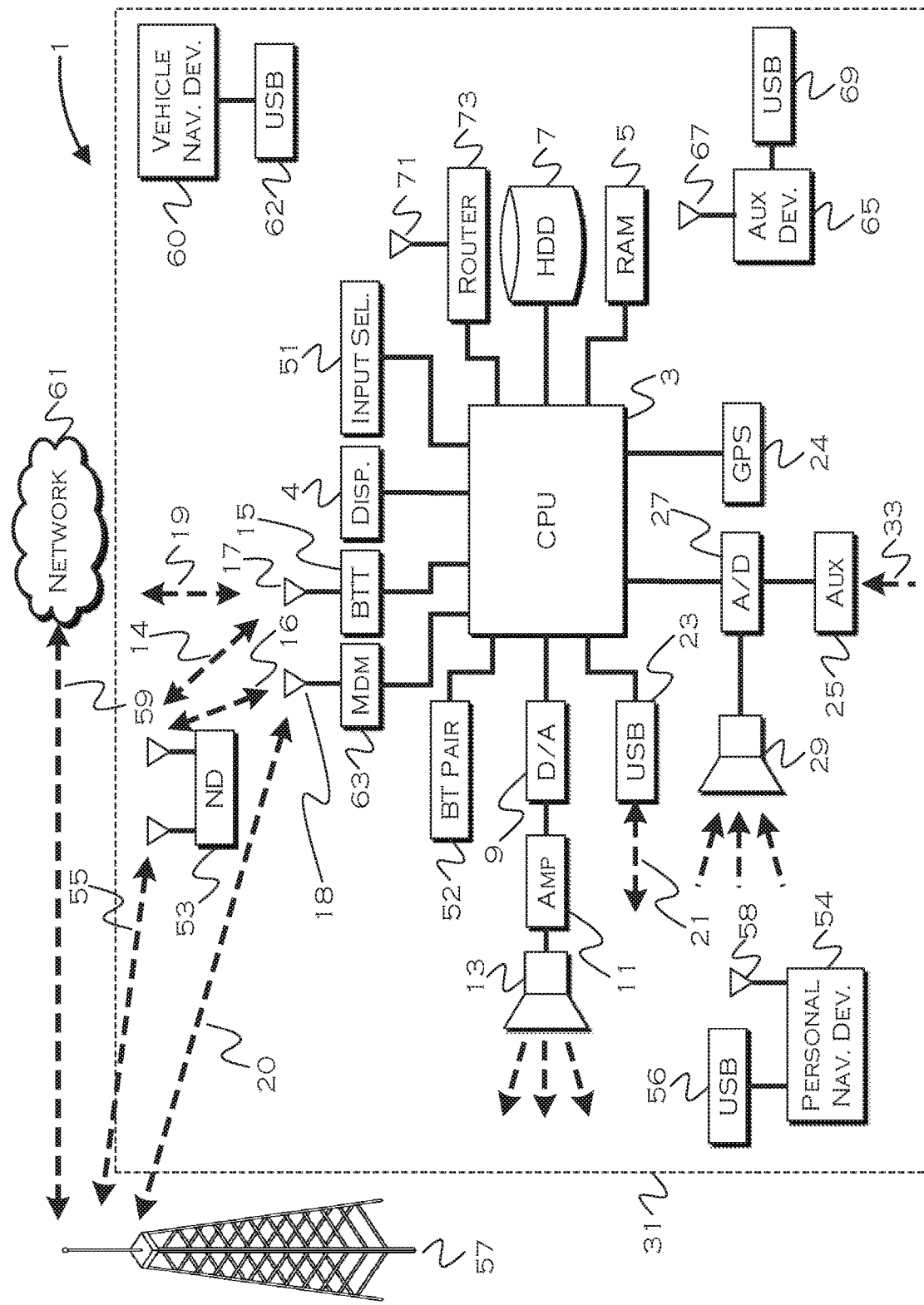
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

When pre-recorded content is available, it is possible to download a buffered amount of content in advance of actual playback. This is useful in case a connection is interrupted, and such a buffer is further useful as one method of implementing the illustrative embodiments. Radio stations also generally buffer live content, to avoid any mishaps or cursing over the air. As such, the radio typically has content of a certain amount prepared in advance of playback, whether that content is live or pre-recorded. Songs are also pre-recorded content, and so a playlist for a block of upcoming music content could be downloaded and buffered based on metadata included with a live broadcast. In these and similar manners, a vehicle can buffer a certain amount of content prior to playback.

Radio stations may also release/broadcast meta-data relating to current programming. The data may lay out planned advertisement segments, and the vehicle could potentially buffer these advertisements in advance of playback. Even if the exact moment of playback were not known until it happened, the vehicle could have all the advertising pre-downloaded in advance of that moment. Further, since the radio itself may have a buffer of a few minutes, the real-time engagement of an advertisement stream on the broadcast side would happen a few minutes in advance of the playback on the vehicle side, allowing for planning at least a few minutes ahead.

Since many vehicles have both radio and cellular/Wi-Fi connectivity, the vehicle can use a data-stream distinct from the radio broadcast to transfer data related to the broadcast. That is, the vehicle could receive data over a telematics connection while receiving radio broadcast signals in the traditional manner, and the telematics data can be used to supplement the radio signal as appropriate.

For most audio content, especially advertising, it is possible to accelerate, for example, a 33 second advertisement into a 30 second window without noticeable impact on a listener. Thus, if an advertising plan included seven 33 seconds slots, by accelerating those slots into 30 second slots, a window of 21 seconds could be created for which no content was slated. A 20 second advertisement could be inserted into such a window, effectively creating an additional advertising opportunity without using additional advertising time (from the original advertising block). Speed-up of video advertising may also be possible, although this may be more noticeable with video content, so greater care may need to be taken if the illustrative concepts are applied to video playback, which they certainly could be.

Figure 2:
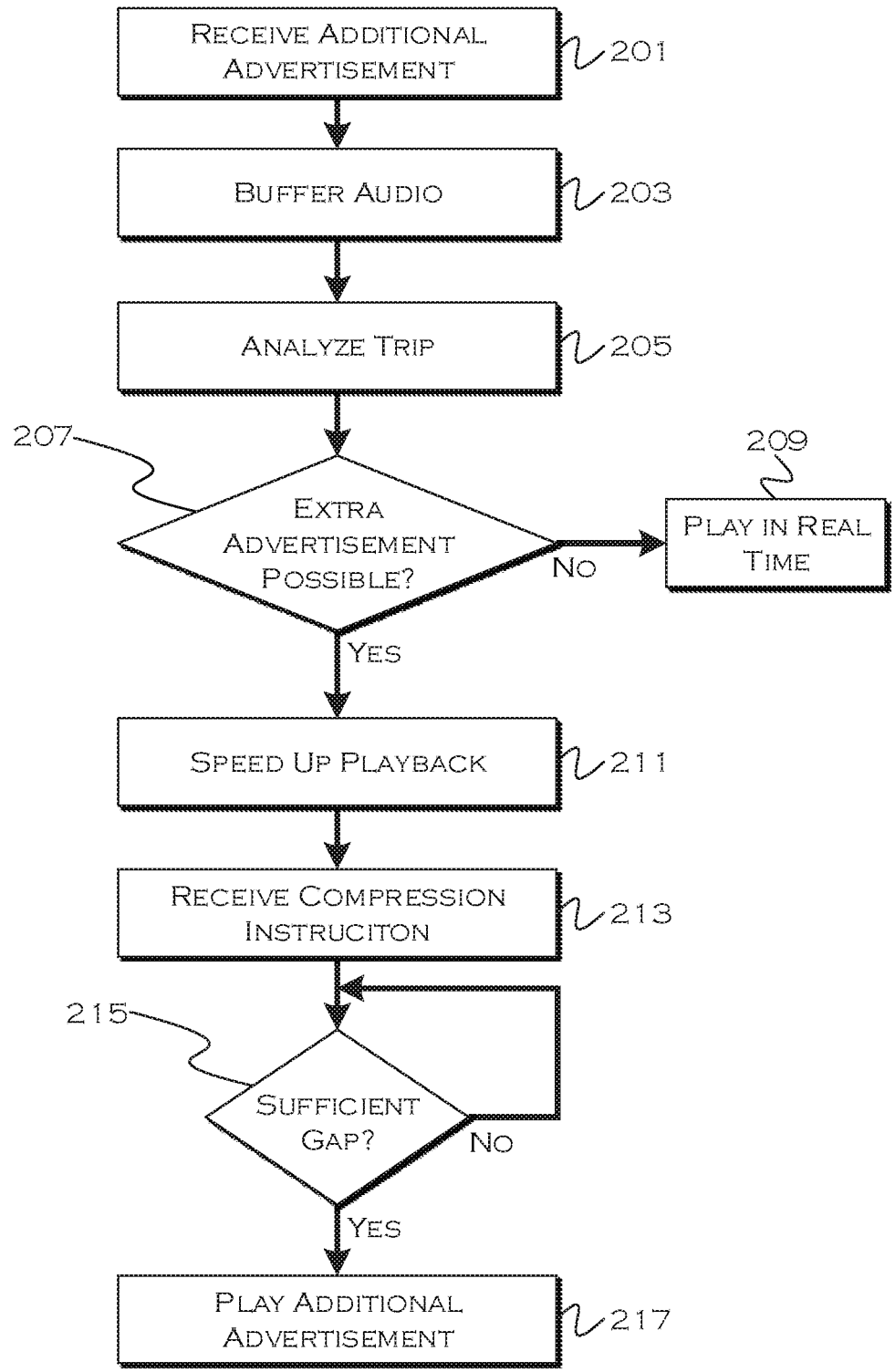
FIG. 2 shows an illustrative process for buffer acceleration.

FIG. 2 shows an illustrative process for buffer acceleration. In this illustrative example, the process receives an instruction to compress a stream for accelerated playback. This could be, for example, in order to free up space to insert additional content, or, for example, in response to a determination that a compressed stream will result in a full commercial being played that would otherwise be missed.

While it is possible to compress audio to create an artificial gap in a stream, in order to insert content, it may also be possible to compress audio to ensure full playback. For example, if a planned stream of four 33 second commercials exist, but the user is 120 seconds from a destination, only about half of the last commercial will be heard. By speeding up each clip to 30 seconds, which may not be noticeable to a listener, all four commercials will be played before the user arrives (and presumably shuts off the radio). Thus, even if advertisers do not like the idea of their commercials being accelerated, this process can actually be beneficial to the advertisers themselves. And then, if there is an extra amount of airtime remaining because the user did not immediately power down upon arrival, the provider (vehicle provider, for example) could insert additional paid content. Thus, the model can dynamically adapt to time remaining in a journey, and provide additional assurances that a full commercial may be heard that would otherwise almost certainly be cut-off.

In this example, a process controlling the playback (such as an on-board process) receives 201 a compression instruction. In this example, the process will be described with respect to buffering and accelerating pre-recorded audio, although the same techniques could be applied to live audio, assuming the live audio could be suitably buffered in a manner acceptable to the listener.

The process buffers 203 audio, which in this example, may include downloading upcoming audio, such as a commercial block, in advance of the audio playing. As previously noted, the process may use a data connection to download the audio even if the current playback is over the radio. Then, when a commercial break is reached, the process could playback the downloaded audio at an accelerated rate, including any added commercial(s), and then switch back to the live stream when the commercial break ended on the live stream.

The process then analyzes 205 a remaining trip, which can include determining how much time is left in the trip and whether it will be possible to insert an accelerated 207 advertisement block before the journey ends. This consideration could include at least one of determining whether acceleration will result in the user hearing an additional already-planned commercial and/or a whole newly-added commercial. In either event, an advertiser gains a benefit at no real cost to the listener or other advertisers. If there is no utility in the accelerated programming 207, the process may simply play out the radio in real time for the duration of the journey. If there is some benefit from acceleration, the process may speed-up 211 playback as appropriate. For example, if the next commercial block was 15 minutes away, and the journey only had 10 minutes remaining, there may be no reason to engage accelerated playback, either because the system will not accelerate live audio or because the system will not reach a commercial in time in any event.

If the process is speeding up playback, the process may also receive 213 an additional advertisement. For example, if the process was speeding up playback that was intended to allow all commercials to be played by the time a user arrives, the process may still receive an additional advertisement to fill a time gap created by the speed-up. If the user arrives late, or leaves the radio on, there will be a natural gap of dead air because of the accelerated playback, before live radio resumes, so the extra commercial can be used to fill the dead air depending on whether or not the radio is actually still turned on when the dead air is reached.

If the process has accelerated 215 enough content to create a sufficient gap to play the additional commercial, the process may insert 217 the additional commercial into the existing gap, such that by the time the inserted commercial ends, the gap will be reduced by the length of the commercial (which may or may not bring the feed back to real time).

Figure 3:
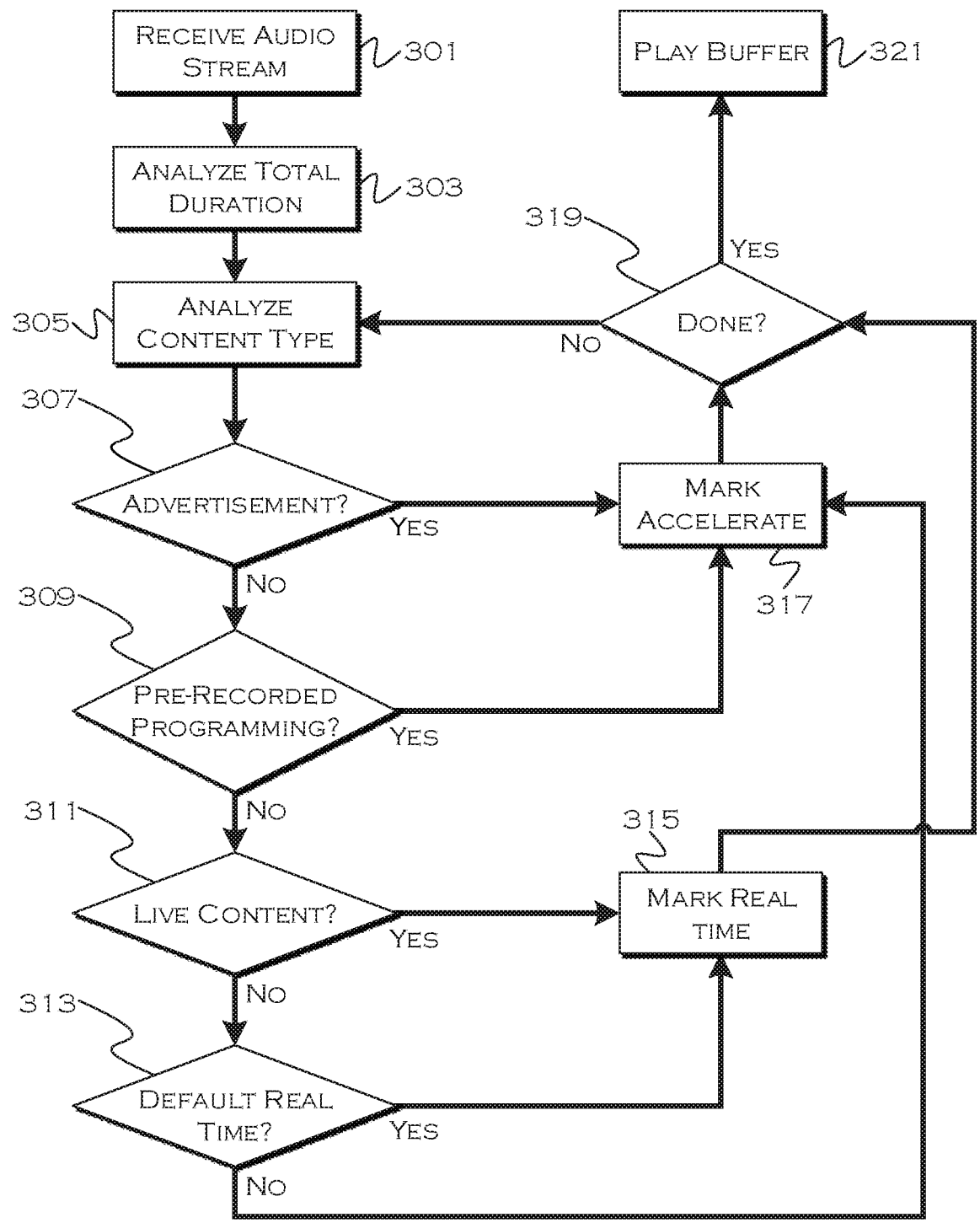
FIG. 3 shows an illustrative process for buffer acceleration planning.

FIG. 3 shows an illustrative process for buffer acceleration planning. This process operates on a preplanned audio stream, which may include both pre-recorded content and/or planned content. For example, one hour of playback may be pre-recorded, allowing the process to operate with a great deal of freedom. Another hour may be live with pre-recorded commercials, and the process may receive simply the loose plan plus some data for the prerecorded segments, and then have to play back the accelerated pre-recorded segments when a live feed data indicator indicates those segments are being actually played.

In this process, the process may analyze the total 303 time segments as well as individual content types 305, to determine which portions (planned portions or downloaded portions) correlate to accelerable data (based on an agreement with the broadcaster, for example). So, in this example, advertisement data 307 may be accelerable, as well as certain pre-recorded programming 309, but all live content 311 may need to be played live. The process may also have a default 313 setting for content that is not defined, which in this example is to play the content unaltered.

For accelerable content, the process may flag 317 the content as accelerable, either on a schedule or in a buffer if the content is already downloaded. For live content (and the default in this instance), the process may mark the content as "real time" or "unaltered." This indicates that no acceleration is to be applied while playback occurs. Once all content is marked 319, the process may play 321 live radio and the buffer as appropriate (based on the markings). If the whole content stream is prerecorded, the process may play from the buffer once sufficient content has been downloaded to utilize the buffer.

Figure 4:
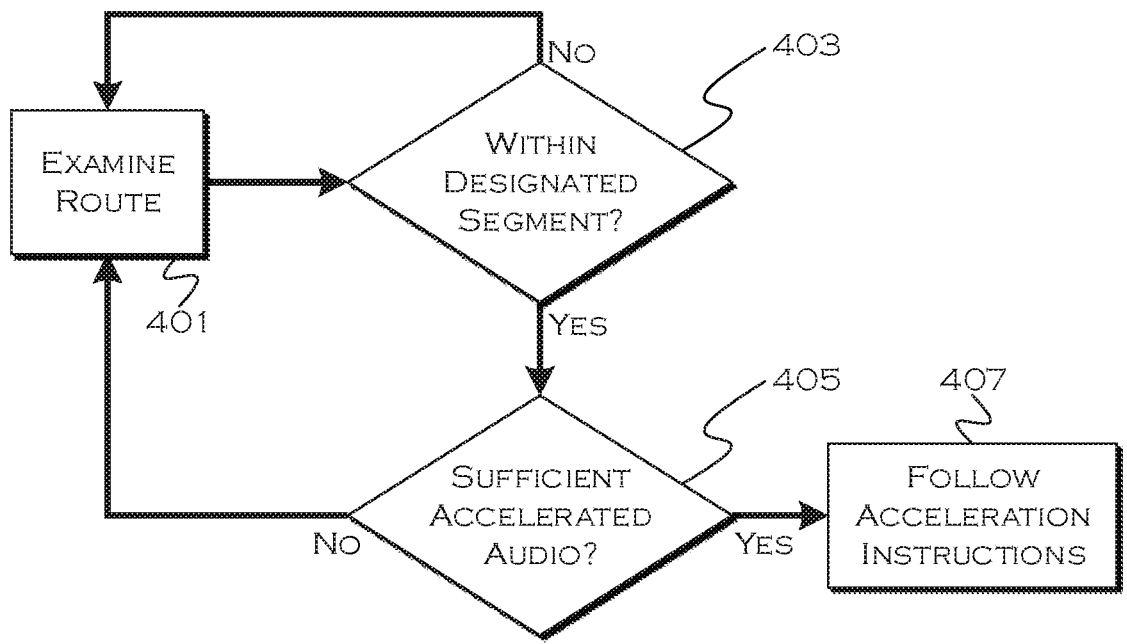
FIG. 4 shows an illustrative process for buffer acceleration inception.

FIG. 4 shows an illustrative process for buffer acceleration inception. In this illustrative process, the system only engages acceleration during a final part of a journey, which is one example of how acceleration can be used, but in a limited manner, to perhaps "squeeze" a single additional commercial or commercial completion into a programming block over a trip. That is, in this example, the process does not necessarily maximize all programming blocks for commercials (although it certainly could do so), but rather engages the acceleration in a limited manner based on the correspondence of a journey end and a commercial block.

The process examines 401 the route to determine 403 if a vehicle is supposed to reach a destination at the time a commercial block is scheduled for playback. If the correlation exists, the process also determines 405 if there is sufficient audio in the commercial block to warrant acceleration. This second determination may depend on the reasons for acceleration, for example. If the acceleration is only performed to insert additional paid content, then a single commercial is likely not worth accelerating, as this will not create sufficient dead air to include more content. On the other hand, if the purpose is to insert content or complete playback, the process may always engage acceleration for commercial segments that play when the journey ends, to maximize user exposure to paid content. If there is sufficient reason to accelerate the content, the process may follow 407 the acceleration instructions.

Figure 5:
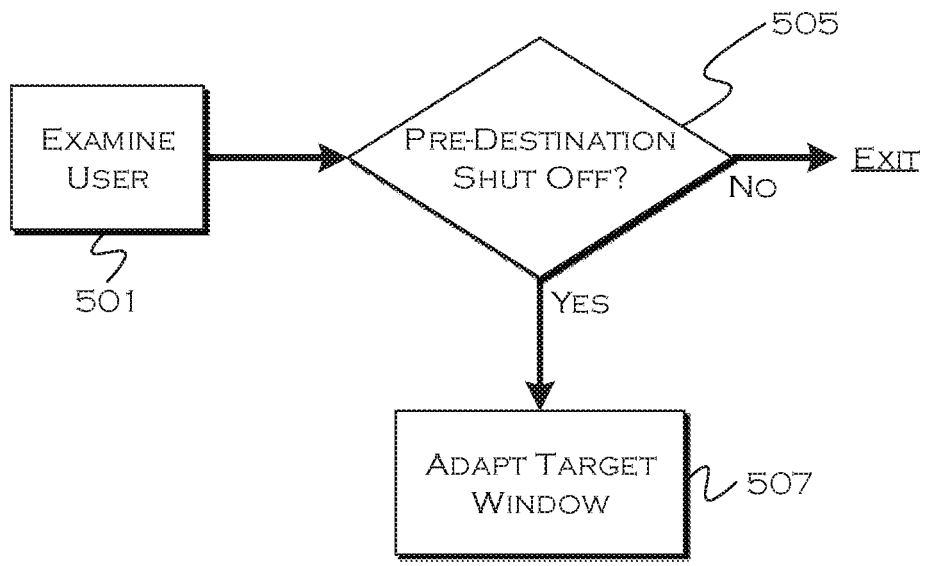
FIG. 5 shows an illustrative process for user-centric acceleration planning.

FIG. 5 shows an illustrative process for user-centric acceleration planning. This process can accommodate certain user behaviors. For example, if a user tends to switch to a certain radio station at a certain location, or within a certain distance from a destination, this can be considered a known "end" to a journey even though the vehicle may be physically moving. That is, this is an "end" for the current radio station, and content acceleration can be accommodated accordingly. In a similar manner, users may switch off, switch on or otherwise alter radio listening in replicable and known patterns, and those patterns for that user may be used to determine such artificial "end" points for the journey.

If the process examines 501 user data and observes that, for example, the user has a tendency to disable 505 the radio at a certain location (e.g., entering a neighborhood) or always five minutes before arriving at a destination, for example, the process may adapt 507 a target window for acceleration. This adaptation is essentially changing the target window to either an artificial destination (entering the neighborhood) or timing point (5 minutes before the journey ends) and treating that place/time as the effective destination.

Figure 6:
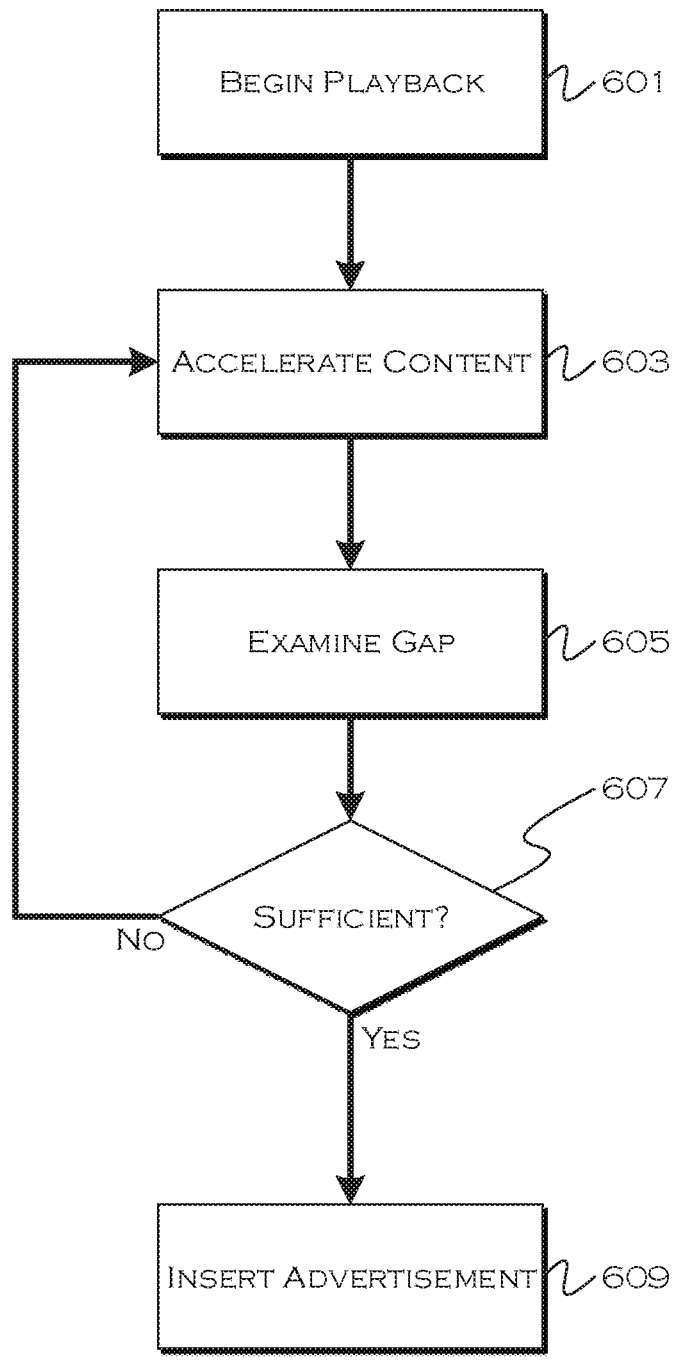
FIG. 6 shows an illustrative advertisement-insertion process.

FIG. 6 shows an illustrative advertisement-insertion process. In this example, the process may dynamically insert content each time a sufficient window is reached. The process may have a set of insertion advertisements of varied lengths, and may insert them in an "as possible" manner or in a first come first served manner (among other options). This example process demonstrates one possible insertion procedure, with the determination about the sufficiency of the gap correlating to the strategy for insertion (e.g., "sufficient" may mean different things based on the insertion strategy).

The process begins 601 playback of a content stream and accelerates 603 the various content portions as possible or previously determined to be appropriate. As each individual content portion (e.g., one commercial) reaches an end, the process examines 605 the size of a gap created by the aggregate acceleration. If the gap is of sufficient size 607 to accommodate the planned next insertion, the process inserts 609 the content to fill the created dead air. Strategies such as this one limit the chances of having hanging dead air, by using gaps as created, but there are certainly other insertion strategies that are equally usable, even if they may result in a few seconds of dead air.

The illustrative embodiments allow for improved advertisement exposure to both preplanned and newly available advertisements, without affecting the user experience or consumption of existing commercial content.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
    a processor configured to:
    reach a planned advertisement playback point in a live broadcast;

responsive to reaching the point, begin advertisement playback, over the live broadcast, from a stored buffer of advertisements predesignated by a broadcast entity for playback in the live broadcast; and accelerate advertisement playback from the buffer at a predefined acceleration rate, responsive to determining that acceleration will result in a certain number of advertisements completing playback by a target time, the target time:
- being ahead of when the same advertisements will complete playback in the live broadcast and
- being a projected time ahead of vehicle arrival at a destination, resulting in a time gap between the target time and an actual projected arrival time, wherein the processor is configured to insert an additional advertisement into the time gap, once created through acceleration, to meet the certain number of advertisements achievable through acceleration.

2. The system of claim 1, wherein the processor is configured to download prerecorded content, independent of a received radio broadcast, to create the buffer.

3. The system of claim 2, wherein the processor is configured to download the prerecorded content via a telematics connection.

4. The system of claim 1, wherein the processor is configured to determine the playback point based on data received as part of the broadcast.

5. The system of claim 1, wherein the processor is configured to determine the playback point based on data received independent of the broadcast, but reflecting a reflected broadcast playback plan.

6. The system of claim 1, wherein the processor is configured to download a new advertisement having a length no greater than the time gap.

* * * * *